United States Patent
Tabaries

(10) Patent No.: US 12,468,796 B2
(45) Date of Patent: Nov. 11, 2025

(54) ELECTRONIC CONTROL UNIT ADAPTED TO INTELLIGENT TRANSPORT SYSTEM COMMUNICATIONS AND CORRESPONDING METHOD

(71) Applicant: STMicroelectronics (Rousset) SAS, Rousset (FR)

(72) Inventor: Laurent Tabaries, Aubagne (FR)

(73) Assignee: STMicroelectrionics (Rousset) SAS, Rousset (FR)

(*) Notice: Subject to any disclaimer, the term of this patent is extended or adjusted under 35 U.S.C. 154(b) by 215 days.

(21) Appl. No.: 18/207,292

(22) Filed: Jun. 8, 2023

(65) Prior Publication Data
US 2023/0401306 A1    Dec. 14, 2023

(30) Foreign Application Priority Data

Jun. 13, 2022  (FR) .................................. 2205653

(51) Int. Cl.
*G06F 21/44* (2013.01)
*G06F 21/78* (2013.01)

(52) U.S. Cl.
CPC .............. *G06F 21/44* (2013.01); *G06F 21/78* (2013.01)

(58) Field of Classification Search
CPC .......... G06F 21/44; G06F 21/78; G06F 21/64; G06F 63/101; G06F 63/123; G06F 2221/2151; H04W 12/06; H04W 12/106
See application file for complete search history.

(56) References Cited

U.S. PATENT DOCUMENTS

| | | | |
|---|---|---|---|
| 10,491,235 B1 | 11/2019 | Ruelke et al. | |
| 11,405,786 B1* | 8/2022 | Monteuuis | H04W 12/122 |
| 11,863,991 B2* | 1/2024 | Yang | H04W 12/06 |
| 2008/0010207 A1* | 1/2008 | Yanagihara | H04L 63/10 705/51 |
| 2020/0137580 A1* | 4/2020 | Yang | H04W 12/122 |
| 2022/0045870 A1 | 2/2022 | Russell et al. | |
| 2023/0100792 A1* | 3/2023 | Petit | H04L 63/1491 726/23 |

FOREIGN PATENT DOCUMENTS

| | | |
|---|---|---|
| EP | 3249626 A1 | 11/2017 |
| EP | 3396922 A1 | 10/2018 |
| JP | 2017046080 A * | 3/2017 |

OTHER PUBLICATIONS

INPI Search Report and Written Opinion for priority application, FR 2205653, report dated Jan. 11, 2023, 8 pgs.

* cited by examiner

*Primary Examiner* — Matthew T Henning

(74) *Attorney, Agent, or Firm* — Crowe & Dunlevy LLC

(57) ABSTRACT

The electronic control unit includes a communication circuit adapted to receive intelligent transport system messages, an authentication circuit designed to authenticate the received messages, a non-volatile memory configured to record the authenticated received messages, and a secure element. The secure element includes a blacklist of automatically excluded senders and is configured to directly reject a received message from a sender on the blacklist without authentication using the authentication circuit. Alternatively, the secure element includes a whitelist of automatically allowed senders and is configured to directly record a received message from a sender on the whitelist in the non-volatile memory without authentication using the authentication circuit.

25 Claims, 2 Drawing Sheets

ELECTRONIC CONTROL UNIT ADAPTED TO INTELLIGENT TRANSPORT SYSTEM COMMUNICATIONS AND CORRESPONDING METHOD

PRIORITY CLAIM

This application claims the priority benefit of French Application for Patent No. 2205653, filed on Jun. 13, 2022, the content of which is hereby incorporated by reference in its entirety to the maximum extent allowable by law.

TECHNICAL FIELD

Embodiments and implementations relate to electronic control units (ECUs), typically intended for automobile electronic equipment, that are configured to communicate in an intelligent transport system type system.

BACKGROUND

Intelligent transport systems (usually referred to using the acronym "ITS") is the term for electronic and computing technologies in the field of road transport and logistics, particularly for personal automobiles. An intelligent transport system, ITS, is designed for digitally managing the regulation of automobile traffic, managing messages communicated between cars "C2X" (which stands for "Car to everything"), also known as "V2X" (which stands for "Vehicle to everything"), and other cars or infrastructures (traffic lights, roundabouts, etc.) equipped with the intelligent transport system ITS. The C2X messages are primarily basic safety messages, BSMs, communicating weather alerts, stopped cars or accidents, signaling malfunction alerts, etc.

The C2X messages are received on the fly, analyzed and stored in a typically general-purpose non-volatile memory, usually a "Flash" memory, of the electronic control unit. Furthermore, to protect against the risk of corruption of the data stored in the memory, for example "hacking" of the memory to access sensitive or confidential information or keys, it is provided that the C2X messages have a very short lifetime, and that their transmissions be repeated very frequently.

Thus, in the intelligent transport system ITS, there is a reception processing target of one thousand (1000) messages received per second. Current electronic control units adapted to ITS communications are not capable of attaining this reception processing target.

Indeed, to ensure the reliability of ITS-type communications, a digital signature of the sender is typically provided in the C2X messages. The digital signature conventionally uses "PKI" public key infrastructures and "DSA_256" or "ECDSA_256" type signature algorithms (acronyms of the terms "Digital Signature Algorithm" and "Elliptic Curve DSA", respectively, denoting techniques well-known to a person skilled in the art). Thus, for each incoming message, a cryptographic verification of the ECDSA_256 signature is executed in order to authenticate the received message before storing it in memory.

The authentication procedures, particularly of the ECDSA_256 type, typically require a large quantity of computing resources and are relatively long to implement.

Consequently, when the electronic control unit receives too many messages, a "bottleneck" phenomenon in the received message processing can occur, and slow down the reception bandwidth well below the target mentioned above.

The problem may become worse as cars and infrastructures are equipped for the intelligent transport system ITS.

Conventional proposed solutions to this problem involve increasing the processing capacity of the electronic control units. That being said, the increase in processing capacity also increases the energy consumption, the size, and price of the integrated circuits of the electronic control units intended for the automobile.

Thus, there is a need to avoid having to use higher-performance (and therefore larger, more expensive, and more energy-consuming) integrated circuits, to meet the high bandwidth requirement, while benefiting from superior security and reliability.

SUMMARY

According to one aspect, the invention proposes an electronic control unit that includes a communication circuit adapted to receive intelligent transport system type messages, an authentication circuit adapted to authenticate the received messages, a non-volatile memory configured to record the authenticated received messages, and a secure element. The secure element includes a first list of automatically excluded senders, and the electronic control unit is configured to directly reject a received message from a sender on the first list without performing the authentication of this message with the authentication circuit. Alternatively or in combination, the secure element includes a second list of automatically allowed senders, and the electronic control unit is configured to directly record a received message from a sender on the second list in the non-volatile memory without performing the authentication of this message with the authentication circuit.

Thus, the direct rejection of a received message, i.e., the message is not processed or recorded, is very fast and helps prevent system blockage in the case of a large number of received messages. Similarly, the direct recording of a received message is very fast and helps prevent system blockage in the event of a large number of received messages, including repeat messages at a high frequency.

Furthermore, the risk of extracting or modifying data from the first and second lists is extremely low, given that they benefit from the security of the secure element. Consequently, the direct processing operations (rejection or recording) of the messages from senders contained in said lists remain reliable despite the lack of authentication.

In particular, the secure element can advantageously include hardware protection means adapted for at least "EAL4+" or higher (for example "EAL5+", or "EAL6+") certification.

According to an embodiment, the secure element is configured to modify the first list of automatically excluded senders or the second list of automatically allowed senders upon a command sent on a secure channel by an authorized server.

This allows for the dynamic adaptation of the lists of automatically excluded or allowed senders, reliably and securely.

According to an embodiment, the communication circuit is adapted for wireless communications according to the IEEE 802.11.p standard protocol (also known as "G5") or according to the 5G protocol.

According to an embodiment, the non-volatile memory is not hardware-secure.

According to an embodiment, the non-volatile memory is hardware-secure, with the secure element including the hardware-secure non-volatile memory and a continually active clock counter (for example, even active in very low-consumption type operating modes). The secure element is configured to assign the authenticated received messages a timestamp data item from the clock counter and to record the authenticated received messages and the respective timestamp data in the hardware-secure non-volatile memory.

This embodiment has the particular advantage of increasing the lifetime of the stored messages and reducing the number of systematic repeat message processing operations since the authenticated messages benefit from the hardware protection of the hardware-secure non-volatile memory. The timestamp data item enables secure and perfectly reliable management of the longer message lifetime.

Moreover, regarding this embodiment, a person skilled in the art may, for all practical purposes, refer to the French Patent Application Number 2205652, entitled "Method for managing intelligent transport system communications and corresponding electronic control unit" filed Jun. 13, 2022, the contents of which are incorporated by reference in their entirety to the maximum extent allowable under the law.

According to another aspect, a method is proposed for managing intelligent transport system type communications, including receiving a message, authenticating the received message, and recording the authenticated received message in a non-volatile memory of an electronic control unit. The received message is directly rejected without having performed the authentication of this message if it is from a sender on a first list of automatically excluded senders contained in a secure element of the electronic control unit. Alternatively, the received message is directly recorded in the non-volatile memory without having performed the authentication of this message if it is from a sender on a second list of automatically allowed senders contained in the secure element.

According to an implementation, a modification of the first list of automatically excluded senders or the second list of automatically allowed senders is performed upon a command sent on a secure channel by an authorized server.

According to an implementation, the communications are wireless communications according to the IEEE 802.11.p standard protocol (or "G5") or according to the 5G protocol.

According to an implementation, the non-volatile memory is not hardware-secure.

According to an implementation, the method including assigning the authenticated received messages a timestamp data item from a continually active clock counter belonging to the secure element, and recording the authenticated received messages and respective timestamp data in the non-volatile memory. The non-volatile memory is hardware-secure and belongs to the secure element.

BRIEF DESCRIPTION OF THE DRAWINGS

Further advantages and features of the invention will emerge on studying the detailed description of embodiments and implementations, in no way restrictive, and of the appended drawings wherein.

DETAILED DESCRIPTION

Figure 1:
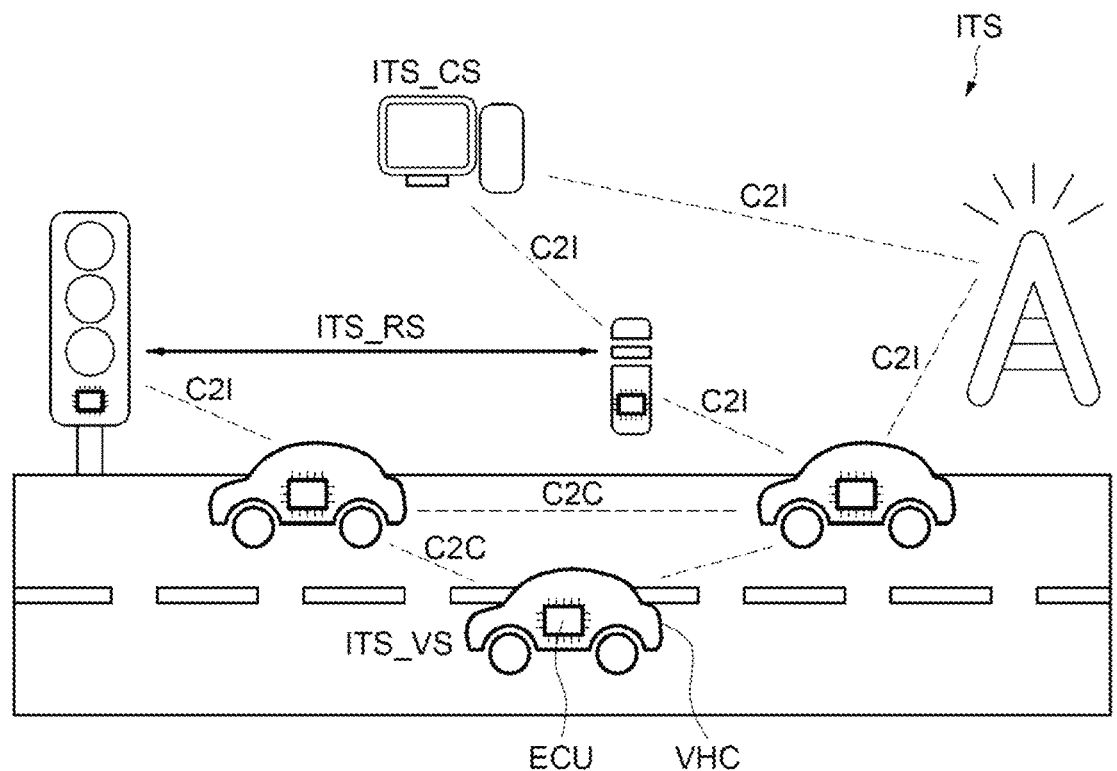
FIG. 1 is a diagrammatical representation of an intelligent transport system disclosed herein.

FIG. 1 illustrates an example of an intelligent transport system (ITS).

The ITS includes a network of vehicle stations (ITS_VS), roadway infrastructure stations (ITS_RS), and at least one central station (ITS_CS). Vehicles (VHC), such as automobiles, heavy goods vehicles, two-wheeled vehicles, etc., are ITS_VS stations in the system and can communicate with neighboring vehicle stations (ITS_VS) through C2C messages (taken from the term "car to car"). The vehicle stations (ITS_VS) can also communicate with neighboring road infrastructure stations (ITS-RS), such as road signaling elements (traffic lights, markers, etc.) through C2I messages (taken from the term "car to infrastructure"), and also with the central station (ITS_CS) through C2I messages via a telecommunication network or via the roadway infrastructure stations (ITS_RS). The general messages C2I, C2C are also described by the abbreviation C2X (taken from the term "car to everything").

C2X messages are particularly basic safety messages (BSMs), communicating weather alerts, stopped car or accident alerts, signaling malfunction alerts, etc. The messages C2X are communicated via a wireless communication protocol, in particular the IEEE 802.11p standard protocol processing wireless accesses in "WAVE" ("Wireless Access to Vehicular Environment") vehicle environments also known as "G5" or "ITS-G5". The messages C2X can also be communicated via the "5G" protocol, for example, as defined in the European Telecommunications Standards Institute standard "ETSI F5G".

The different stations of the ITS, in particular, the "connected object" type stations (ITS_RS, ITS_VS) (i.e., the stations other than the central station ITS_CS), include electronic control units (ECU), typically intended for automobile electronic equipment, adapted to implement C2X (C2C, C2I) communications in the ITS.

Figure 2:
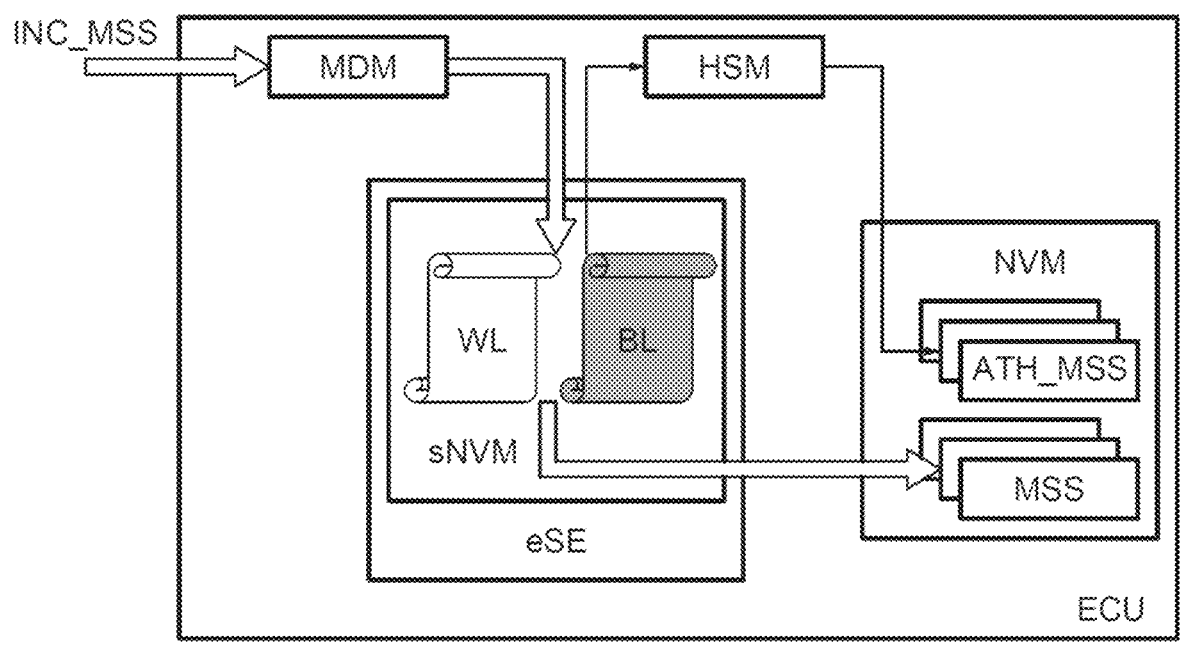
FIG. 2 is a block diagram of the electronic control unit of FIG. 1.

Reference is made in this regard to FIG. 2.

FIG. 2 illustrates an electronic control unit (ECU) as mentioned with reference to FIG. 1.

The ECU can belong to a terrestrial motor vehicle (VHC), such as an automobile, a heavy goods vehicle, a two-wheeled vehicle, or a roadway infrastructure device such as traffic lights, a marker, a traffic sign, an information or advertising sign, an emergency call station, or others.

The ECU comprises a communication circuit (MDM), typically a "modem", adapted to wireless communications according to the IEEE 802.11p standard protocol, or according to the 5G protocol, as mentioned above. In particular, the communication circuit (MDM) is capable of receiving incoming messages (INC_MSS) (C2X) from the ITS.

The ECU comprises an authentication circuit (HSM) adapted to authenticate the received messages (INC_MSS). For example, the authentication circuit (HSM) is capable of deciphering a digital signature of the sender of the message (INC_MSS). The digital signature is typically encoded in the message (INC_MSS) by a "DSA_256" or "ECDSA_256" (acronyms of the terms "Digital Signature Algorithm" and "Elliptic Curve DSA", respectively) type 256-bit signature algorithm. Thus, for the incoming messages (INC_MSS), a cryptographic verification of the ECDSA_256 signature can be executed by the authentication circuit (HSM).

The electronic control unit (ECU) typically comprises a general-purpose non-volatile memory NVM, such as a flash memory. The general-purpose non-volatile memory NVM is not necessarily hardware-secure; indeed, so-called "general-purpose" devices are not typically secure or have a lower-level "EAL" certification than that of the secure element eSE (see hereinafter). Conventionally, all the received messages INC_MSS are recorded in the general-purpose memory NVM after being authenticated ATH_MSS. That being said, in the conventional case, to limit the risk of data extraction from the memory NVM, the recorded messages have a very short lifetime and must be repeated regularly, with the cryptographic verification of the signature at each repeat. This conventional implementation is not advantageous, particularly in terms of energy consumption and use of the computing resources of the authentication circuit HSM.

However, the electronic control unit (ECU) comprises a secure element eSE, including a first list of automatically excluded senders BL, usually referred to as the "blacklist," and, in combination or alternatively, a second list of automatically allowed senders WL, usually referred to as the "whitelist," for example, recorded in a hardware-secure non-volatile memory sNVM. The electronic control unit (ECU) is configured to directly reject a received message from a sender from the blacklist BL without authentication with the authentication circuit HSM and, respectively, to directly record a received message MSS from a sender from the whitelist WL in the non-volatile memory NVM or sNVM without authentication with the authentication circuit HSM.

It is indeed possible to identify the sender of a message without implementing the authentication processing by the authentication circuit HSM. Thus, the direct rejection procedure of a received message from a sender identified in the blacklist BL is swift and does not block the system in the event of a large number of received messages. A direct rejection of a received message consists simply of not processing or recording the message.

Similarly, the direct recording procedure MSS of a received message from a sender identified in the whitelist WL is swift and does not block the system in the event of a large number of received messages, including repeat messages at a high frequency.

For example, the secure element eSE is "secure" in that it includes hardware protections such as active shield, environmental parameter monitoring, fault injection protection, side-channel attack protection means, or other means. More generally, the secure element includes hardware protections capable of obtaining "EAL4+" or "EAL5+" (acronym of the terms "Evaluation Assurance Level 4+/5+") common criteria certification, i.e., evaluation assurance level 4 or 5 based on common criteria, typically defined in the ISO-15408 standards. The certification can be obtained, for example, by fulfilling a class 5 advanced vulnerability analysis "AVA_VAN5" (for "Vulnerability Assessment" and "Vulnerability Analysis") of said common criteria.

Thus, the secure element eSE is substantially "tamper-proof" (i.e., tamper-proof to the extent of its certification), and the risk of extraction or modification of the data from the blacklist BL and the whitelist WL is extremely low. Consequently, the immediate processing operations (direct rejection or direct recording) of the messages from senders contained in said lists BL, WL remain reliable despite the lack of authentication.

Furthermore, the secure element eSE is advantageously configured to modify the blacklist of automatically excluded senders BL and the whitelist of automatically allowed senders WL upon a command sent on a secure channel by a server authorized to perform this modification.

For example, the secure channel can be implemented with a secure end-to-end connection with a Secure Channel Protocol from the Global Platform standard, for example, according to the "SCP11.a", "SCP11.b", "SCP11.c" or "SCP03" protocols.

For example, the server authorized to perform a modification in the blacklist BL and in the whitelist WL can be a server of the central station ITS_CS of the intelligent transport system ITS, or a server belonging to the vehicle VHC seller, or a server belonging to the public authority. For example, in this regard, the secure element eSE incorporates, at the manufacture thereof, authority certificates designating the servers authorized to perform a modification in the blacklist BL and in the whitelist WL.

Thus, the blacklist BL can be dynamically adapted to add new fraudulent actors thereto, and the whitelist can be dynamically adapted to include new trusted actors therein, or for example in the event of an incident requiring priority processing of the messages from a specific sender.

Finally, if a received message INC_MSS comes from a sender who is not contained in either the blacklist BL or in the whitelist WL, then the authentication circuit HSM performs the authentication of the typical received message INC_MSS, i.e., the cryptographic verification of the message signature. The authenticated messages ATH_MSS are recorded in the general-purpose non-volatile memory NVM.

Figure 3:
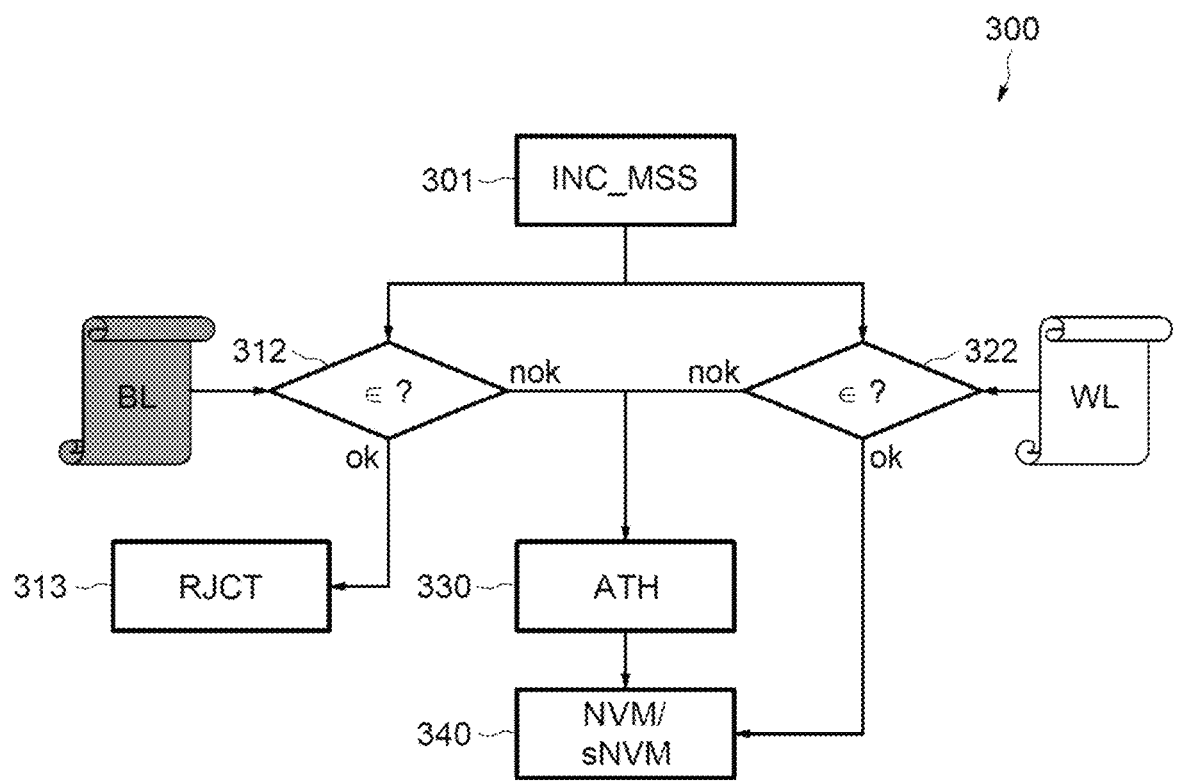
FIG. 3 is a flowchart of a method of managing the communications of the intelligent transport system of FIG. 1.

FIG. 3 illustrates a method 300 corresponding to the management of the communications of the intelligent management system ITS, implemented by the electronic control unit, ECU, described with reference to FIG. 2.

The method 300 starts with a reception 301 of a message INC_MSS. A step 312 verifies whether the received message INC_MSS is from a sender belonging to the blacklist of automatically excluded senders BL. If the response is affirmative "ok", the method goes to a step 313 of direct rejection RJCT of the received message INC_MSS. If the response is negative "nok", a step 330 of authentication ATH of the received message is implemented, as described above in relation to the authentication circuit HSM.

If the message is authenticated, the method comprises a step 340 of recording the authenticated received message in the non-volatile memory NVM or optionally in the hardware-secure non-volatile memory sNVM belonging to the secure element eSE. A step 322 verifies whether the received message INC_MSS is from a sender belonging to the whitelist of automatically allowed senders BL. If the response is affirmative "ok", the method goes directly to the step 340 of recording the received messages in the non-volatile memory NVM/sNVM without implementing the authentication 330. If the response is negative "nok", the method goes to the step 330 of authentication ATH, then to the step 340 of recording the received message in the non-volatile memory NVM if the message is authenticated.

Either of the verification steps 312 and 322 is performed according to the use of either, respectively, the blacklist BL and the whitelist WL. In the case of using both the blacklist BL and the whitelist WL, the respective verification steps 312 and 322 can be performed simultaneously, or subsequently, i.e., any one of the verifications 312; 322 is performed in the case of a negative result "nok" of the other verification 322; 312.

Moreover, the invention is not restricted to these embodiments and implementations but encompasses all alternative embodiments.

Figure 4:
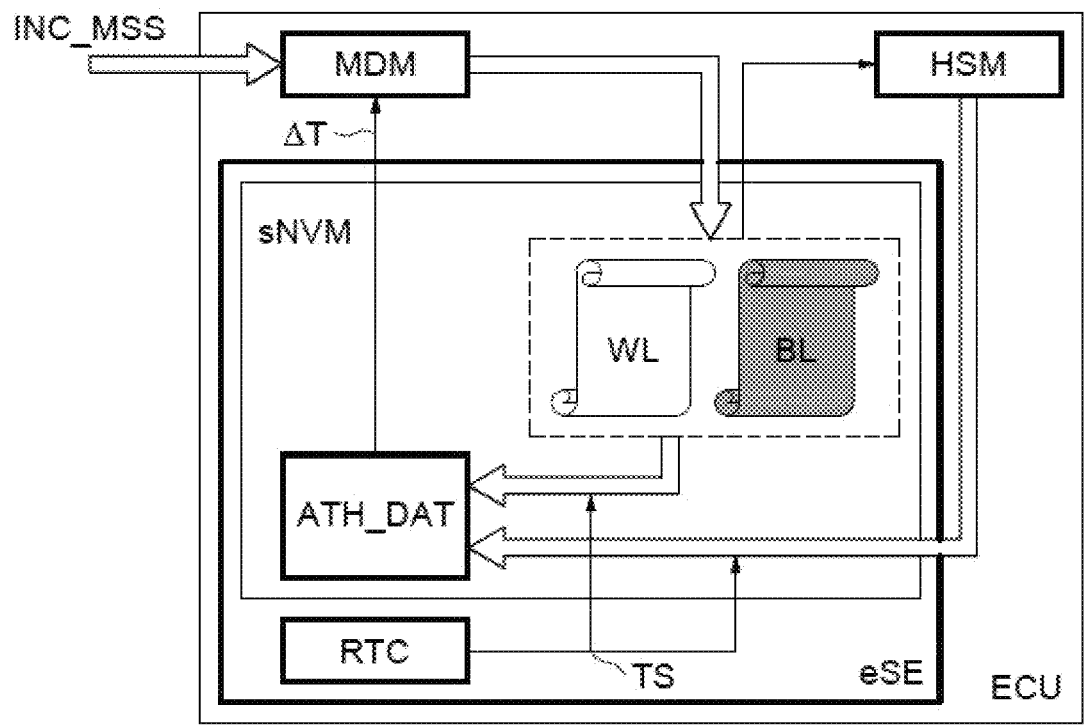
FIG. 4 is a block diagram of another electronic control unit disclosed herein.

1. For example, with reference to FIG. 4, it is proposed according to an aspect to combine the technique described above with reference to FIGS. 1 to 3 (the common elements bear the same references and are not all detailed once again here) with a technique of the type of that described in the French Patent Application Number 2205652, entitled "Method for managing intelligent transport system communications and corresponding electronic control unit" filed Jun. 13, 2022, the contents of which are incorporated by reference in their entirety to the maximum extent allowable under the law. In detail, this technique comprises, on one hand, using the hardware-secure non-volatile memory (of level EAL4+ or higher) to store the messages INC_MSS; and, on the other, assigning the messages recorded in the secure non-volatile memory sNVM a timestamp data item from a continually active clock counter RTC belonging to the secure element eSE. Thus, the received messages from a sender from the whitelist WL, or the received and authenticated messages (i.e., the received messages from a sender absent from the blacklist BL and absent from the whitelist WL) are recorded in the hardware-secure non-volatile memory sNVM with the respective timestamp data item. In particular, the continually active clock counter RTC is advantageously configured to generate a current value of a reference time base, in a standby operating mode and in an active secure element operating mode eSE.

Storing the messages in the hardware-secure non-volatile memory makes it possible to increase the lifetime ΔT of the stored messages (starting to run from the timestamp data item), and thus reduce equally the number of systematic repeat message processing and recording operations. The timestamp value enables secure and perfectly reliable management of the longer message lifetime ΔT.

2. According to a further aspect, a terrestrial motor vehicle is also proposed, incorporating an electronic control unit, ECU, as described above with reference to FIGS. 1 to 4.

3. According to a further aspect, a roadway infrastructure device is also proposed, incorporating an electronic control unit, ECU, as described above with reference to FIGS. 1 to 4.

The invention claimed is:
1. An electronic control unit, comprising:
  a communication circuit configured to receive intelligent transport system (ITS) messages;
  an authentication circuit configured to authenticate the received ITS messages and generate authenticated ITS messages;
  a first non-volatile memory configured to record the authenticated ITS messages; and
  a secure element;
  wherein the secure element includes a second non-volatile memory being hardware secure and storing a blacklist list of automatically excluded senders where the electronic control unit is configured to directly reject a received ITS message from a sender on the blacklist, without performing authentication of this ITS message with the authentication circuit, wherein the first non-volatile memory and the second non-volatile memory are physically separate memory structures with different security characteristics.

2. The electronic control unit according to claim 1, wherein the secure element is configured to modify the blacklist of automatically excluded senders in response to receipt of a command sent on a secure channel by an authorized server.

3. The electronic control unit according to claim 1, wherein the communication circuit is configured for wireless communications according to an IEEE 802.11.p standard protocol or a 5G protocol.

4. The electronic control unit according to claim 1, wherein said first non-volatile memory is not hardware-secure.

5. The electronic control unit according to claim 1, wherein the secure element includes a continually active clock counter, the secure element being configured to assign each of the authenticated ITS messages a timestamp data item from said clock counter, and to record said authenticated ITS messages and their respective timestamp data in the hardware-secure non-volatile memory.

6. The electronic control unit according to claim 1, wherein the first non-volatile memory is not hardware-secure, wherein the different security characteristics include the second non-volatile memory requiring a higher authentication level to access than the first non-volatile memory.

7. An electronic control unit, comprising:
  a communication circuit configured to receive intelligent transport system (ITS) messages;
  an authentication circuit configured to authenticate the received ITS messages, thereby generating authenticated ITS messages;
  a first non-volatile memory configured to record the authenticated ITS messages; and
  a secure element;
  wherein the secure element includes a second non-volatile memory being hardware secure and storing a whitelist of automatically allowed senders where the electronic control unit is configured to directly record a received ITS message from a sender on the whitelist in the first non-volatile memory, without performing authentication of this ITS message with the authentication circuit, where the first non-volatile memory and the second non-volatile memory are physically separate memory structures with different security characteristics.

8. The electronic control unit according to claim 7, wherein the secure element is configured to modify the whitelist of automatically allowed senders in response to receipt of a command sent on a secure channel by an authorized server.

9. The electronic control unit according to claim 7, wherein the communication circuit is configured for wireless communications according to an IEEE 802.11.p standard protocol or a 5G protocol.

10. The electronic control unit according to claim 7, wherein said first non-volatile memory is not hardware-secure.

11. The electronic control unit according to claim 7, wherein the secure element includes a continually active clock counter, the secure element being configured to assign each of the authenticated ITS messages a timestamp data item from said clock counter, and to record said authenticated ITS messages and their respective timestamp data in the hardware-secure non-volatile memory.

12. The electronic control unit according to claim 7, wherein the first non-volatile memory is not hardware-secure, wherein the different security characteristics include the second non-volatile memory requiring a higher authentication level to access than the first non-volatile memory.

13. A method for managing intelligent transport system (ITS) communications, comprising:
  receiving an ITS message;
  authenticating the received ITS message to generate authenticated ITS messages; and
  recording the authenticated ITS message in a first non-volatile memory of an electronic control unit;
  wherein the received ITS message is directly rejected, without performing said authentication, if the received ITS message is from a sender on a blacklist of automatically excluded senders contained in a second non-volatile memory of a secure element of the electronic control unit; and wherein the received ITS message is directly recorded in the first non-volatile memory, without performing said authentication, if the received ITS message is from a sender on a whitelist of automatically allowed senders contained in the second non-volatile memory of the secure element, wherein the first non-volatile memory and the second non-volatile memory are physically separate memory structures with different security characteristics.

14. The method according to claim 13, wherein a modification of the blacklist of automatically excluded senders or of the whitelist of automatically allowed senders is performed upon a command sent on a secure channel by an authorized server.

15. The method according to claim 13, wherein the ITS communications are wireless communications according to an IEEE 802.11.p standard protocol or a 5G protocol.

16. The method according to claim 13, wherein said first non-volatile memory is not hardware-secure.

17. The method according to claim 13, further comprising assigning the authenticated ITS messages a timestamp data item from a continually active clock counter belonging to the secure element, and recording said authenticated ITS messages and respective timestamp data in the second non-volatile memory.

18. The method according to claim 13, wherein the first non-volatile memory is not hardware-secure and the second non-volatile memory is hardware-secure, wherein the different security characteristics include the second non-volatile memory requiring a higher authentication level to access than the first non-volatile memory.

19. An intelligent transport system (ITS), comprising:
a network of vehicle stations;
roadway infrastructure stations;
at least one central station for managing communications between the network of vehicle stations and the roadway infrastructure stations;
wherein the network of vehicle stations, the roadway infrastructure stations, and the at least one central station are configured to use a wireless communication protocol for transmitting car-to-everything (C2X) messages between therebetween;
electronic control units (ECU) associated with said vehicle stations and roadway infrastructure stations, wherein each ECU includes:
a communication circuit configured for wireless communications;
an authentication circuit configured to authenticate received C2X messages by deciphering digital signatures of a sender, thereby generating authenticated C2X messages;
a first non-volatile memory configured to store the authenticated C2X messages;
a secure element comprising a second non-volatile memory being hardware-secure and storing a blacklist of automatically excluded senders and a whitelist of automatically allowed senders, wherein the ECU is configured to directly reject a received C2X message from a sender in the blacklist without authentication and directly record a received C2X message from a sender in the whitelist without authentication, wherein the first non-volatile memory and the second non-volatile memory are physically separate memory structures with different security characteristics;
wherein the at least one central station is configured to cause updating of the blacklists and the whitelists by transmitting update commands to the ECUs.

20. The ITS of claim 19, wherein the C2X messages include at least one of basic safety messages (BSMs), weather alerts, stopped car alerts, accident alerts, or signaling malfunction alerts.

21. The ITS of claim 19, wherein the secure element is configured to modify the blacklist and the whitelist in response to a command sent on a secure channel by the at least one central station.

22. The ITS of claim 19, wherein the communication circuit is configured for wireless communications according to an IEEE 802.11.p standard protocol or a 5G protocol.

23. The ITS of claim 19, wherein said first non-volatile memory is not hardware-secure.

24. The ITS of claim 19, wherein the secure element includes a continually active clock counter, the secure element being configured to assign each of the authenticated C2X messages a timestamp data item from said clock counter, and to record said authenticated C2X messages and their respective timestamp data in the second non-volatile memory.

25. The ITS according to claim 19, wherein the first non-volatile memory is not hardware-secure, wherein the different security characteristics include the second non-volatile memory requiring a higher authentication level to access than the first non-volatile memory.

* * * * *